Aug. 20, 1935.  W. E. MATHI  2,011,945
MAGNIFYING DEVICE
Filed Aug. 4, 1933

INVENTOR.
Walter E. Mathi

Patented Aug. 20, 1935

2,011,945

UNITED STATES PATENT OFFICE 2,011,945

MAGNIFYING DEVICE

Walter E. Mathi, Oakland, Calif.

Application August 4, 1933, Serial No. 683,651

4 Claims. (Cl. 88—39)

The present invention relates to rules and more particularly to magnifying devices therefor, to enable a person to quickly and accurately find the location of a dimension line on a rule having a closely graduated scale.

It is oftentimes extremely difficult for a person with impaired eyesight, or even normal eyesight, to discern the various interdivisional lines on a closely graduated scale, and particularly the kind very frequently used by the skilled artisan.

It is an object of this invention to provide a magnifying device for such rules which will facilitate the use thereof without eyestrain and which will be easily attached and detached from a standard type of rule without the use of any mechanical appliances.

A further object of the present invention is the provision whereby a magnifying device may be slidably affixed to a rule and held by spring pressure in frictional contact therewith, to remain in a predetermined magnifying position until shifted to a new position by application of manual pressure.

Another object of the invention is a magnifying device in which the magnifying lens is so constructed that it can be placed directly against the object to be magnified and effect sufficient magnification at such close range without causing distortion and loss of image.

Another object of the invention is to provide the supporting frame of a magnifying device with a groove or scriber surface which is alinable under the focal center of a magnifying lens with any dimension line on the scale and which is extended outwardly therefrom and past the external edge thereof to serve as a clearly defined guide line for a scriber tool, in order that the location of a desired dimension line may be more easily transferred from a scale onto another surface, once it has been located through the magnifying lens.

The invention further contemplates an arrangement in magnifying devices in which the slidable supporting frame thereof is not only equipped with a scriber surface, but also with a plurality of adjacent parallel lines which are disposed beneath the magnifying glass and which are arranged so that their combined lateral spacing corresponds to the spacing between two divisional lines on a widely graduated scale, thus providing the user with a magnifying device equipped with sub-graduating means in addition to the guiding surface for cooperation with a scriber tool.

Still another object of the invention is the provision of a suitable magnifying device for rules which possesses the combination of novel features outlined above and which is of a simple and practical design and can be marketed at a reasonable price which is in proportion to the cost of the ruler onto which it is to be attached.

Other objects and features of advantage will appear hereinafter and while only the preferred forms of construction are described and illustrated, it is to be understood that the invention is not limited to such preferred forms but that various changes and adaptations may be made therein without departing from the spirit of the invention as hereinafter claimed.

Referring to the drawing which accompanies the specification and forms a part thereof:

Figure 1:
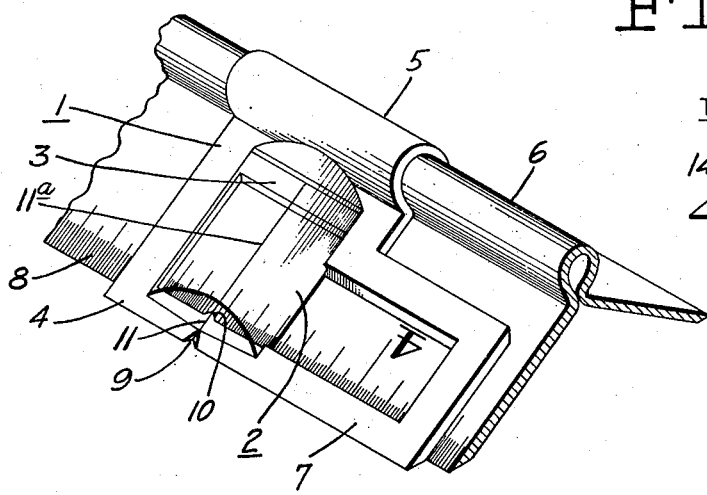
Figure 1 is a perspective view of one form of magnifying device shown in combination with a rule.

Referring to Figure 1 of the drawing, it will be noticed that the magnifying device 1 is shown in combination with a well known type of rule and that it comprises a magnifying lens 2 mounted within a recessed portion 3 of a slidable frame 4. This slidable frame, when viewed in end elevation, conforms to the outline of the rule to which it is affixed and is always held in frictional contact therewith by its semi-circular spring-tempered clamping portion 5 which surrounds the complementary holding member 6 of the rule. The main body portion of frame 4 which supports the magnifying lens 2 is equipped on its lower edge 7, which extends past the edge of the scale 8, with a V-shaped notch 9 which is accurately alined with an indicia pointer 10 formed on the inside of recessed portion 3 by means of a line or groove 11 on the frame 4 extending from the apex of pointer 10 into the notch 9. This pointer 10 is disposed directly underneath the axis of lens 2 and is, therefore, subject to constant magnification along with the portion of the scale 8 to either side thereof. In order to facilitate the reading of the scale 8, the magnifying lens 2 may be provided on its flat bottom face with a hairline 11A which must be also accurately lined up with the notch 9 and the pointer 10 as well as the groove 11.

The lens 2 must be of a special construction in order to produce sufficient magnification when placed directly against the scale without distortion and loss of image. How this is attained will presently be described.

Figure 1A:
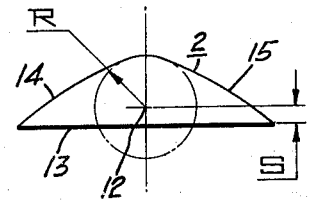
Figure 1A is an end elevation of the special lens employed in the magnifying device illustrated in Figure 1.

In Figure 1A of the drawing this special lens 2 may be seen in end elevation and it is of importance that the curvature center 12 thereof be located a given distance above the base line 13 as shown. Experimentation has proved that this distance must be approximately one-third of the length of the radius used for the curvature at the apex of the lens. In Figure 1A this distance is indicated by "S" and is equal to the amount outlined above, which is one-third of the curvature radius "R". It will thus be seen that due to this special construction of the lens a strong magnification is possible around the axis of the lens with the result that the graduating lines on the scale 8 are separated only around the indicia pointer 10, as is clearly shown in Figure 1 of the drawing, while all the graduating lines to the right and left thereof, towards the edges of the magnifying lens, are brought slightly closer together to compensate for the separation of those few graduating lines which are within the actual field of magnification below the curvature center 12. The two top sides 14 and 15 of the lens 2 can either be slightly curved as shown or else absolutely flat and tangent to "R" at the apex of the lens 2. This construction causes the two angles at the ends of the base line 13 to be quite narrow thus eliminating distortion and loss of image, a disadvantage so often produced by lenses in which these two ends are rounded off and in which the center of the radius for the top curvature is below the base line 13 instead of above the base line 13, as illustrated.

The lens 2 is mounted in such a way that it is not entirely enclosed around its edges by the frame 1, but is open for a short distance facing the graduations of a lower numerical value. This gives the reader of the scale an unobstructed count of all graduating lines to the right and including the last units number indicated on the scale, which, as shown in Figure 1, is the numeral "4", so that the reading directly underneath the hairline 11A would amount to 4 inches and $\frac{52}{100}$ths. Thus, if the user of the rule wishes to mark off any particular dimension line on the scale 8 he will only have to set the indicia pointer 10 or the hairline 11A to the graduating line wanted and then set his scriber tool in the V-notch 9 and he will be able to transfer the exact location of the desired dimension line onto another surface by slight pressure brought to bear upon the scriber to cause an indenture.

Figure 2:
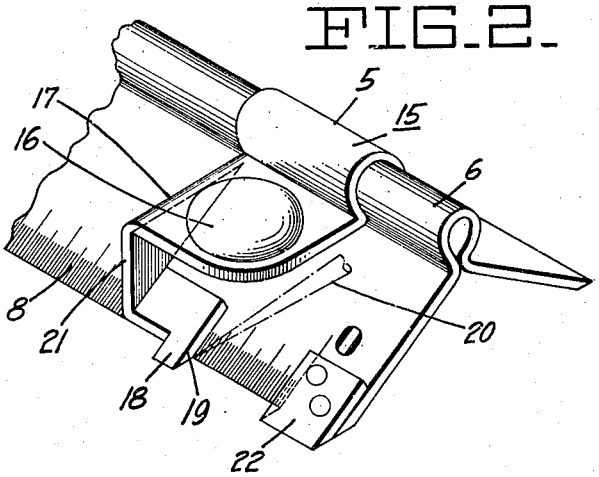
Figure 2 is a perspective view of another form of magnifying device slidably affixed to a rule to illustrate the manner in which a scriber tool may be used in cooperation therewith.

In Figure 2 of the drawing the magnifying device 15 is of a slightly different construction to that shown in Figure 1. Instead of the magnifying lens being of a special construction as in Figure 1, it is of the usual convex type of lens which must be spaced a given distance from the object to be magnified. For this reason the lens 16 is mounted a sufficient space above the scale 8 in a slidable frame 17 which is provided with the same clamping device 5 for attaching the frame 17 to the holding piece 6 of the rule as the one disclosed in Figure 1. The mounting 17 for the lens 16 is also provided with a scriber tool abutment 18 which is located partly under the lens 16 for constant magnification and is extended outwardly past the edge of scale 8 for cooperation with a scriber tool. Its scriber surface 19 being placed directly in line with and beneath the focal center of the lens, so that when lined up with a desired dimension line on the scale 8 it can serve as a guiding surface for the scriber tool 20 indicated by the dotted lines. A right angular connection wall 21 rigidly carries the abutment 18 and permits the entire mounting to be made out of a single stamping of suitable metal.

In order to permit the reader of the scale to use a pair of dividers for transferring the distance desired onto another surface such as onto a different layout, or onto a templet, a permanent stop 22 has been riveted to the scale 8, as shown in Figure 2. This stop is lined up with the zero dimension line and it is only necessary for the user to put one point of the dividers against the surface 19 in line with the center of the magnifying lens 16 and the other point against the face of the stop 22 and he will have the dividers set to the desired dimension.

Figure 3:
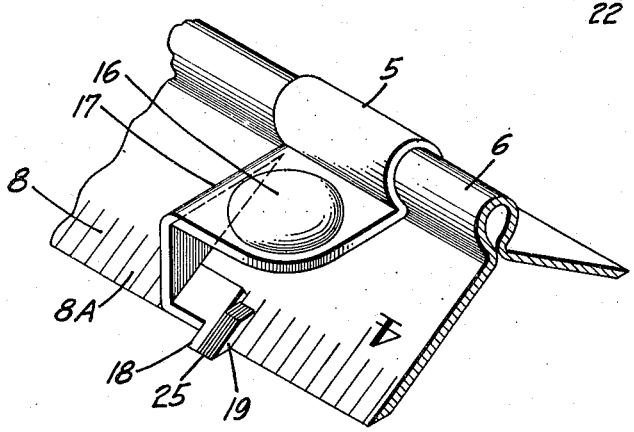
Figure 3 is a similar view to that shown in Figure 2, but being in addition thereto equipped with a sub-graduating scale beneath the magnifying lens.

The magnifying device shown in Figure 3 is identical in construction to the one shown in Figure 2, except that the abutment 18 thereof is provided on its top face with a scale 25. This sub-graduating scale is divided for purposes of illustration into five equal spaces, each of which represents one hundredth of an inch, so that the combined distance of these five spaces corresponds to one single divisional space 8A on the scale 8 or to one-twentieth of an inch.

Figure 4:
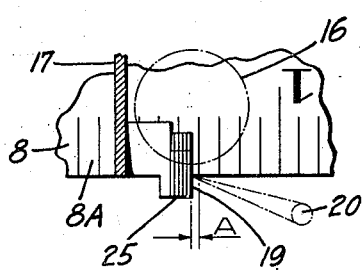
Figure 4 is a fragmentary plan view of the device shown in Figure 3, illustrating the method of how to read and mark off a dimension line when a sub-graduating scale of the type illustrated in Figure 3 is being employed.

Suppose it is desired to accurately mark off one inch and 22/100ths on a scale such as shown in Figures 3 and 4. This distance could ordinarily be only approximated without the sub-graduating scale 25, but with the latter forming part of the magnifying device it can be done quickly and accurately as will presently be described.

In the fragmentary plan view shown in Figure 4 of the drawing is illustrated the manner in which a reading is taken when such a sub-graduating is employed in combination with a magnifying device of the nature disclosed.

Since each divisional space 8A is equal to one-twentieth of an inch or to five-hundredths of an inch when reduced to hundreds, it would take four of such divisional spaces 8A to measure off 20/100ths of an inch. Now, in order to accurately mark off the additional two-hundredths of an inch required, it is necessary to align the third graduating line on the sub-graduating scale with the fifth graduating line on the scale 8, counting from the "one" inch dimension line, as shown in Figure 4, then the distance marked "A" amounts to two-hundredths of an inch or the difference between three and five hundredths of an inch. The scriber surface 19 is now indicating the correct dimension, which is one inch and 22/100ths and the user can place his scriber tool 20 against it to make an indenture on the surface onto which this dimension is to be transferred in the manner illustrated.

The same method of sub-graduating a scale is of course also applicable to a thirty-second scale, where the sub-graduating scale 25 would be sub-graduated into 64ths of inch spaces for a total distance of 1/8 of an inch.

I claim:

1. In combination with a rule, a magnifier, a shiftable frame supporting said magnifier on said rule, a marker line on said frame visible through said magnifier and alignable beneath said magnifier with any graduating line on said rule, said frame and line extending outwardly beyond the edge of said rule, and having an enlarged V-slot for cooperation with a scriber element.

2. In combination with a rule, a convex lens having a flat base side, shiftable mounting for said lens, clamping means on said mounting for holding said lens closely adjacent said rule without coming into frictional contact therewith, an indicia pointer on said mounting disposed between said lens and said rule and alignable with any graduating line on said rule, a groove on said mounting in registry with said pointer, said groove being extended outwardly therefrom and to the edge of said mounting to terminate in a V-slot for cooperation with a scriber tool.

3. In combination with a rule, a magnifying lens, a shiftable frame therefor, a scriber abutment on said frame being disposed beneath said magnifier and extending outwardly therefrom past the edge of said rule, a sub-graduating scale on said abutment for sub-graduating a divisional space on said rule under the magnification of said lens.

4. In combination with a rule, a magnifier, a shiftable frame supporting said magnifier on said rule, a marker line on said frame visible through said magnifier and alignable beneath said magnifier with any graduating line on said rule, said frame and marker line extending outwardly beyond the edge of said rule to terminate in a guiding line.

WALTER E. MATHI.